United States Patent
Sato

(10) Patent No.: US 7,064,505 B2
(45) Date of Patent: Jun. 20, 2006

(54) METHOD AND SYSTEM FOR CONTROLLING VEHICLE DOOR POSITION HAVING REDUCED POWER SUPPLY CURRENT REQUIREMENTS

(75) Inventor: Yoshinobu Sato, Tokyo (JP)

(73) Assignee: Fuji Electric System Co., Ltd., Tokyo (JP)

( * ) Notice: Subject to any disclaimer, the term of this patent is extended or adjusted under 35 U.S.C. 154(b) by 0 days.

(21) Appl. No.: 10/921,287

(22) Filed: Aug. 19, 2004

(65) Prior Publication Data

US 2005/0062453 A1 Mar. 24, 2005

(30) Foreign Application Priority Data

Aug. 21, 2003 (JP) ............................. 2003-297535
Mar. 4, 2004 (JP) ............................. 2004-061066

(51) Int. Cl.
*B61D 19/00* (2006.01)
*H02P 3/14* (2006.01)

(52) U.S. Cl. ..................... 318/266; 318/286; 318/376

(58) Field of Classification Search ........ 318/264–266, 318/286, 376, 466–469

See application file for complete search history.

(56) References Cited

U.S. PATENT DOCUMENTS 4,780,619 A * 10/1988 Campbell et al. .......... 307/10.1
5,341,280 A * 8/1994 Divan et al. ................ 363/37
5,552,681 A * 9/1996 Suzuki et al. .............. 318/139

FOREIGN PATENT DOCUMENTS

| EP | 0728 894 | 8/1996 |
|----|----------|--------|
| GB | 2 325 101 | 11/1998 |
| JP | 10 136570 | 5/1998 |
| JP | 2001 078462 | 3/2001 |

OTHER PUBLICATIONS

"Development of Linear Motor Driving Door System for Commuter Train," Yoshihiko Sato et al.; Industrial Application Section of The Institute of Electrical Engineers of Japan, 1999; The Institue of Electrical Engineers of Japan, 1999, pp. 359 to 362.

* cited by examiner

*Primary Examiner*—Bentsu Ro
(74) *Attorney, Agent, or Firm*—Rabin & Berdo P.C.

(57) ABSTRACT

A method and system for controlling vehicle door position having reduced power supply current requirements reduces the cost and weight of a vehicle and further reduces power consumption. The vehicle door control system includes an inverter for converting a DC power source to an AC voltage for driving the motor. The inverter is preceded by a boost converter that maintains a constant voltage at the inverter input, and a capacitor is provided between the converter and inverter for energy storage. Kinetic energy is returned from the door and mechanical portions of the motor through the inverter and stored on the capacitor, reducing the power required from the power source. Operation of the inverter and converter are controlled by timers and detection mechanisms that cease operation of the inverter and converter when the door is held in a fully closed or open position for a predetermined interval.

20 Claims, 4 Drawing Sheets

METHOD AND SYSTEM FOR CONTROLLING VEHICLE DOOR POSITION HAVING REDUCED POWER SUPPLY CURRENT REQUIREMENTS

BACKGROUND OF THE INVENTION

1. Field of the Invention

The invention relates generally motor control systems, and more specifically to a vehicle door positioner power supply system that has a reduced power supply current requirement.

2. Background of the Invention

Automatic vehicle door opening and closing mechanisms are in widespread use in public transportation systems such as trains and buses, as well as in private vehicles adapted for use by the handicapped. The control of the operation of a vehicle door is typically performed by an electronic control system that determines the position and speed of a moving element of an electric motor that operates the door positioning mechanism.

An example of a conventional vehicle door apparatus is described in "Development of linear motor drive door system for commuter train", Sato, et al., Papers delivered in the Convention held by the Industrial Application Section of The Institute of Electrical Engineers of Japan, 1999, The Institute of Electrical Engineers of Japan, 1999, at p. 359 to 362. In the above-referenced paper, the maximum output voltage of the inverter supplying power to the door motor is proportional to the power source voltage of the vehicle power distribution system. Therefore, when the power source voltage is lowered, the maximum voltage that can be supplied to the motor from the inverter is also lowered. Therefore, it is necessary to increase the rated current of the motor to obtain a given motor output when lower power supply voltages will be encountered. It is also necessary to increase the diameter of the wiring supplying power to the electric motor in order to avoid excessive voltage drop, adding cost and weight to the vehicle.

Therefore, it would be desirable to provide a vehicle door positioner power supply system that supplies the maximum output voltage of an inverter to a motor without being influenced by the fluctuation of the power source voltage, thereby reducing the cost and weight of the vehicle. It would further be desirable to provide a vehicle door positioner power supply system that reduces power consumption.

SUMMARY OF THE INVENTION

The above objectives of providing for reduced cost, weight and power consumption in a vehicle door positioning system is accomplished in a method and power supply system for a vehicle door positioner having reduced power supply current requirements.

The power supply system is connected to an electric motor that operates the vehicle door. An inverter supplies AC current to the electric motor and is preceded by a boost converter and capacitor that maintain a predetermined DC voltage at the input of the inverter. The inverter recovers the kinetic energy from the door and other positioning linkages back through the inverter and into capacitor, thereby reducing the overall power requirement of the system. The boost converter may be a current-reversible boost converter that returns power to the power source if the voltage on the capacitor is higher than the power supply voltage.

The boost converter maintains the voltage at the input of the inverter even when the power source voltage drops so that the current rating of the motor and associated wiring can be kept at a nominal level. The operation of the converter and inverter may be ceased in response to detecting that the position of the door is fixed, further improving the efficiency of the power supply system.

The method is a method of operation of the above-described power supply system and may be embodied therein.

The foregoing and other objectives, features, and advantages of the invention will be apparent from the following, more particular, description of the preferred embodiment of the invention, as illustrated in the accompanying drawings.

DETAILED DESCRIPTION OF THE PREFERRED EMBODIMENTS

The invention is directed toward an electronic control system and method for controlling the position of a vehicle door. The control system operates an electric motor that opens/closes the vehicle door, which may be a public transportation vehicle door such as on a train or bus, or may be an automobile door.

Figure 1:
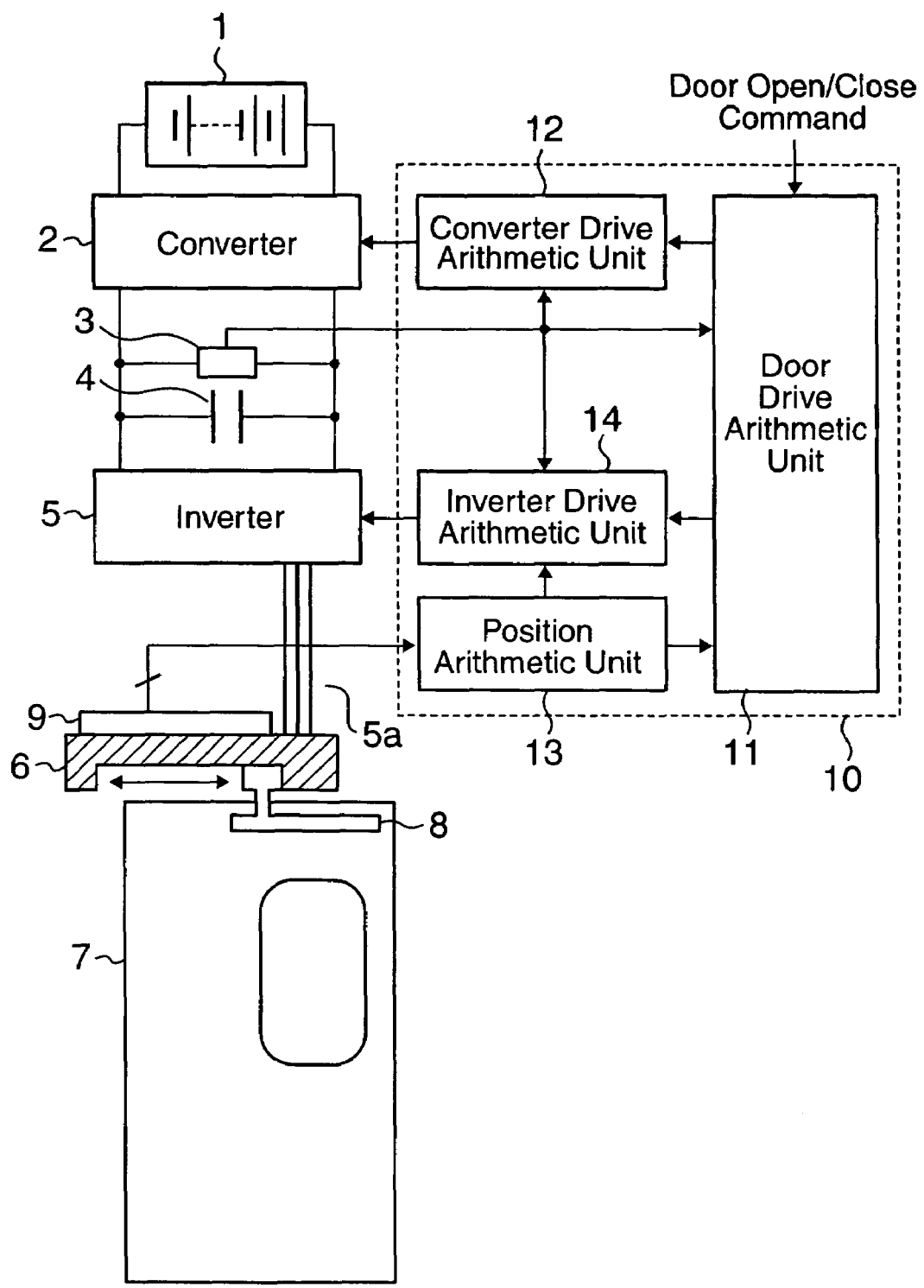
FIG. 1 is a block diagram depicting a vehicle door control system in accordance with an embodiment of the invention.

Referring now to FIG. 1, a block diagram of a vehicle door control system in accordance with an embodiment of the invention is shown. A DC power source 1, such as a battery, supplies power to a current reversible boost converter 2 that perform the DC-DC conversion of the DC power source 1 voltage to boost the voltage to a preset voltage level. A voltage detector 3 is coupled to the output of converter 2 to detect the converter output voltage and an electrolytic capacitor 4 is also coupled to the converter output to level the converter output voltage. The output of converter 2 is further coupled to a three-phase inverter 5 inverter that converts the DC voltage present on electrolytic capacitor 4 into an AC voltage and supplies the AC voltage to a motor 6 (shown as a linear motor) via wiring 5a. Motor 6 drives a vehicle door 7 via a connection portion 8 that transmits a force from motor 6 to the door 7 and an encoder 9 which detects the position of the movable portion of the motor 6 and thus the position of door 7.

A drive controller 10 controls converter 2 and inverter 5. Drive controller 10 includes a door drive arithmetic unit 11 that sends an operate command to converter 2 and inverter 5 to move door 7 in response to a door open/close command. Drive controller 10 also includes a converter drive arithmetic unit 12 that performs computations for driving converter 2 in response to outputs from door drive arithmetic unit 11 and voltage detector 3. Drive controller 10 further includes a position arithmetic unit 13 that computes the position of the movable portion of motor 6 and thereby door 7 from the output of the encoder 9. Drive controller also includes an inverter drive arithmetic unit 14 for performing computations for operating the inverter 5 in response to outputs from door drive arithmetic unit 11, voltage detector 3 and position arithmetic unit 13.

When door 7 is moved from a closed position to a open position and stops at the open position, a door open command is provided to drive controller 10. Door drive arithmetic unit 11 gives an operate command to converter drive arithmetic unit 12 and inverter drive arithmetic unit 14. Converter drive arithmetic unit 12 operates the converter 2 in conformity with the output of the voltage detector 3 such that the voltage of the DC power source 1 is boosted to a desired voltage level. Further, inverter drive arithmetic unit 14 operates inverter 5 so that motor 6 is activated in the proper direction to change the position of door 7 to the open position as determined by the output of the position arithmetic unit 13.

When inverter drive arithmetic unit 14 detects that the door 7 is in the vicinity of the opened position (as reflected by the output of position arithmetic unit 13), inverter drive arithmetic unit 14 controls inverter 5 to decelerate motor 6 in order to reduce the speed of door 7 in anticipation of stopping. Along with the deceleration of motor 6, kinetic energy of door 7 (and the balance of the mechanical linkage including motor 6) is supplied to capacitor 4 through inverter 5. This reduces the output requirements on DC power source, and if the voltage on capacitor 4 exceeds the voltage of DC power source 1, current-reversible boost converter 2 returns power to DC power source 1.

In general, when a linear motor is used as a driving force to open/close door 7, it is possible move door 7 with a reduced number of mechanical parts as compared to that required for a rotary-type motor. Therefore, the use of a linear motor results in reduced loss of energy during door opening and closing operations. When a rotary-type motor is used, the kinetic energy during door deceleration is substantially wholly consumed as loss in the door positioning mechanisms. In contrast, when a linear motor is used, since the loss in the mechanism is small, the electric power produced by the kinetic energy at the time of deceleration can be returned to the power source.

Further, due to the presence of booster converter 2, it is possible to supply a substantially fixed DC voltage to inverter 5 uninfluenced by voltage fluctuations of DC power source 1. Therefore, the maximum output voltage of inverter 5 can always be supplied to motor 6, so that the rated voltage of motor 6 can be increased and the rated current for obtaining a given motor rated output can be reduced. Also, the size of wiring 5a can be reduced and therefore the cost and weight of wires, resulting in a reduction in the weight of the vehicle.

Figure 2:
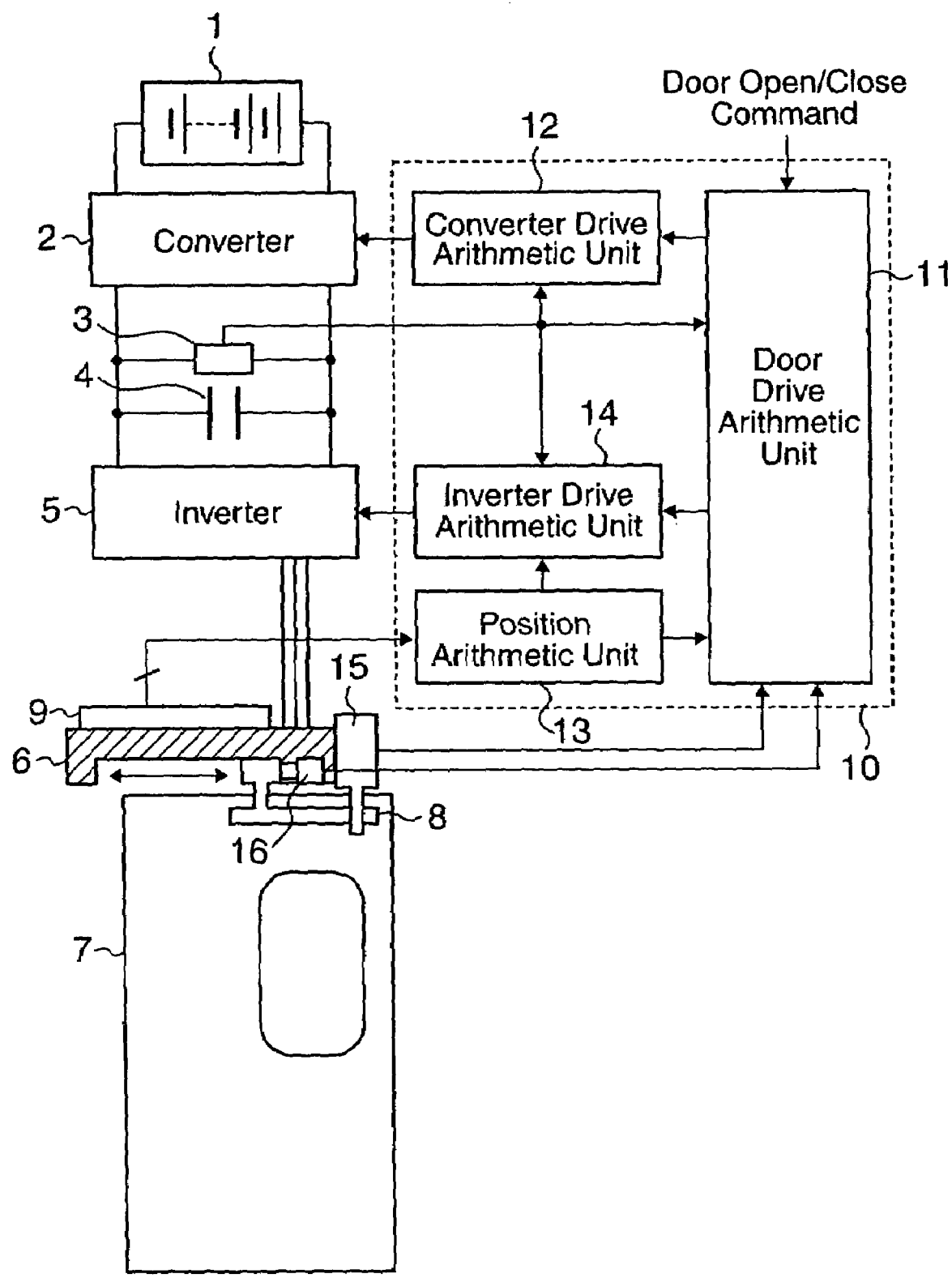
FIG. 2 is a block diagram depicting a vehicle door control system in accordance with another embodiment of the invention.

Referring now to FIG. 2, a vehicle door control system in accordance with another embodiment of the invention is shown. Common elements of FIG. 2 are numbered with the same reference designator as elements in FIG. 1 and operate as described above. Therefore only differences between the embodiment of FIG. 2 and the embodiment of FIG. 1 will be described hereinafter below. In the embodiment of FIG. 2, a terminal position of door (fully closed or fully open) can be detected and the operation of converter 2 and inverter 5 can be ceased, resulting in power savings. Further, a timer within door controller 10A can be used to delay ceasing the operation of converter 2 until a predetermined time period has elapsed after ceasing operation of inverter 5

In the embodiment of FIG. 2, a locking device 15 is provided to mechanically and automatically lock door 7 in a closed position and further provides an output to drive controller 10A. Also, a door closed position detector 16 that detects when the door 7 is in the fully closed state is additionally provided in the vicinity of the door 7 and is coupled to drive controller 10A.

Figure 3:
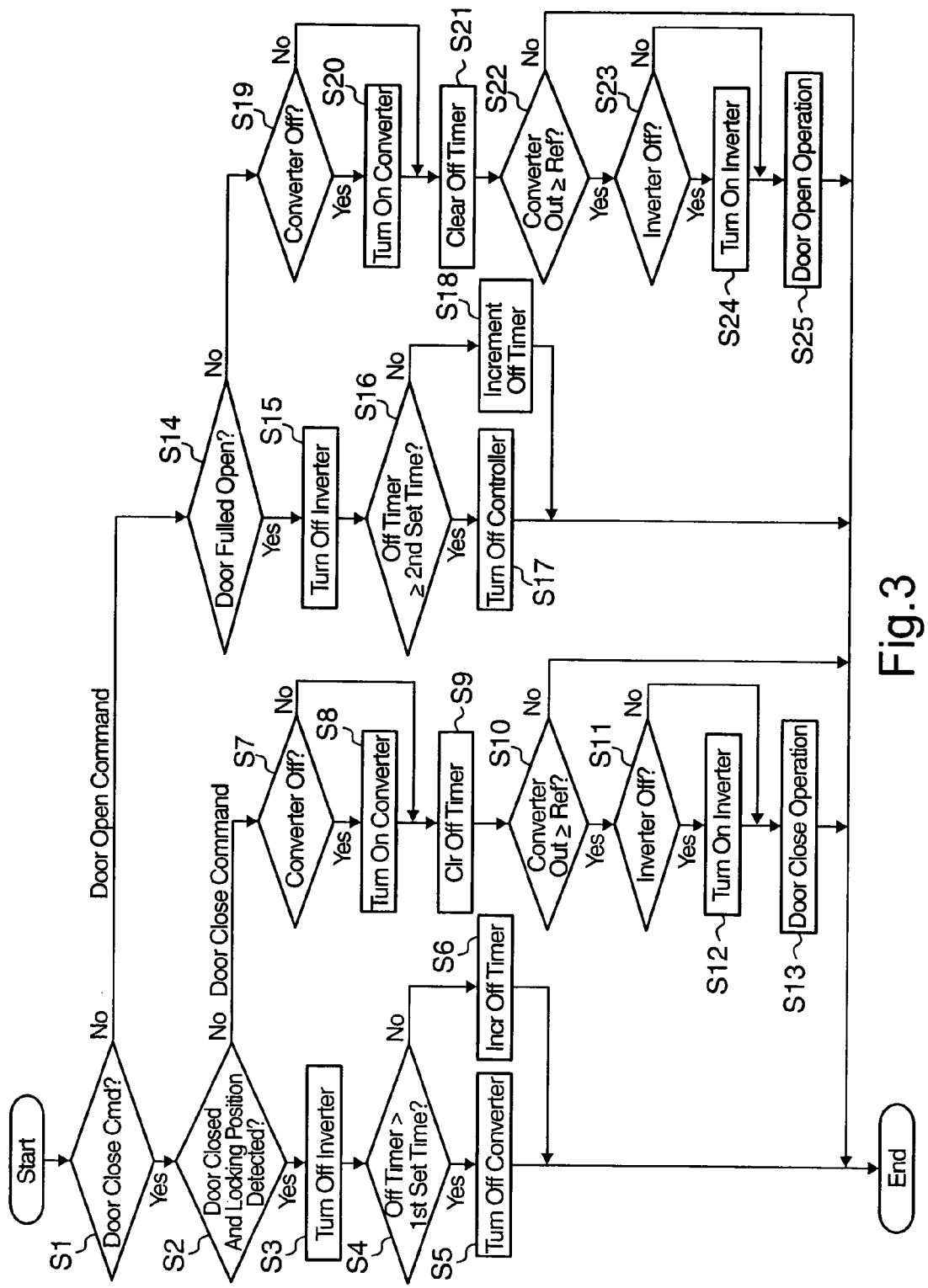
FIG. 3 is a flowchart depicting a method in accordance with an embodiment of the invention.

With reference now to FIG. 3, operation of door drive arithmetic unit 11 in the embodiment of FIG. 2 is depicted in a flowchart. When a door close command is provide to drive control 10 and door 7 is in the fully closed state, outputs are received from both of locking device 15 and door closed position detector 16 (S1 Yes, S2 Yes). When a door open command is received (S1 No), if door drive arithmetic unit 11 determines that door 7 is not at the fully opened position (S14 No), if converter 2 is off (S19 Yes), converter drive arithmetic unit 12 turns on the converter 2 and at the same time clears an OFF timer (S19 to S21). When the output voltage of converter 2 reaches a reference value necessary for operating inverter 5 (S22 Yes), if inverter 5 is off (S23 Yes) inverter drive arithmetic unit 14 turns on inverter 5 (S24). Door 7 is then opened (S25).

When door 7 reaches the fully opened position (S14 Yes), inverter 5 is stopped (S15), and converter 2 is turned off (S17) after an OFF timer value lapses a second set time (S16 Yes). In order to immediately open door 7 when in the closing direction due to the inclination of a vehicle, tampering or the like when door 7 is fully open, the second set time can be extended so that converter 2 continues to run after the inverter 5 is stopped. When the OFF timer value does not reach the second set time, the OFF timer value is incremented and the control cycle is finished (S18).

When a door close command is received (S1 Yes) and there are no outputs from both the locking device 15 and the door closed position detector 16, it is determined that the door is not in the fully closed state (S2 No). Therefore, if converter 2 is off (S7 Yes), converter drive arithmetic unit 12 turns on converter 2 (S8) to commence boosting. Next, the OFF timer is cleared (S9).

When the output voltage of converter 2 reaches the reference value necessary for operating the inverter 5 (S10 Yes), if inverter 5 is off (S11 Yes), inverter drive arithmetic unit 14 turns on inverter 5 to drive the motor 6, thus closing door 7 (S13). Upon detection of outputs from both locking device 15 and door closed position detector 16, it is determined that the door is in the fully closed state (S2 Yes). In response to determining that door 7 is fully closed, inverter drive arithmetic unit 14 turns off inverter 5 (S3) and converter 2 is also stopped (S5) after a lapse of the first set time (S4 Yes). When the OFF timer value does not reach the first set time, the OFF timer value is incremented (S6) and the control cycle is finished.

In the above-described manner, according to the illustrated embodiment, when a door open or close operation is not in progress, operation of the inverter 5 and the converter 2 is ceased (S2 Yes, S3 to S5 and S14 Yes, S15 to S17), thus power consumption is reduced.

Figure 4:
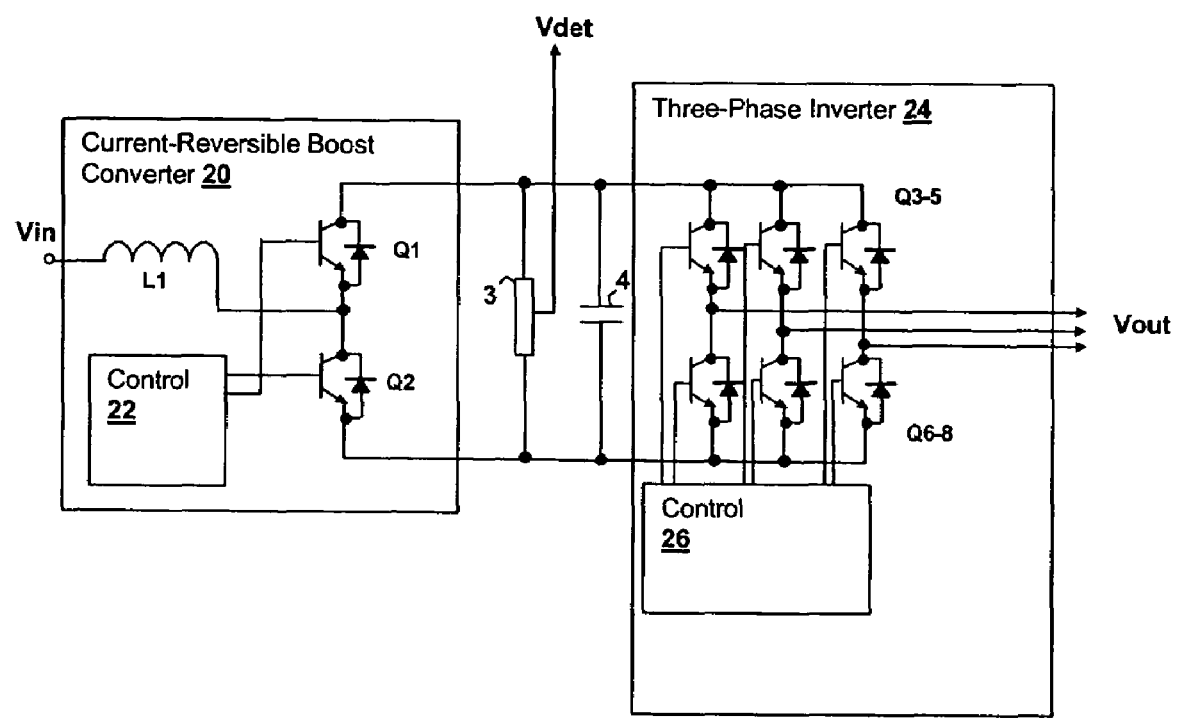
FIG. 4 is a block diagram depicting details of the vehicle door control system of FIGS. 1 and 2.

Referring now to FIG. 4, details of the vehicle door control systems of FIGS. 1 and 2 are shown in a block diagram. Current-reversible boost converter 20 receives a DC input voltage Vin and switches current through inductor L1. Transistors Q1 and Q2 perform switching in response to signals from a converter control circuit 22 to provide a DC voltage on capacitor 4. Voltage detector 3 is shown and provides an output to drive control 10, 10A as described above. Three-phase inverter 24 provides three AC output voltage phases (commonly labeled Vout) via switching of the voltage stored on capacitor 4 through transistors Q3–5 and Q6–8 in response to signals provided from an inverter control circuit 26. When the voltage at any phase of Vout exceeds that of capacitor 4 as will occur during deceleration of door 7, capacitor 4 will be charged through three-phase inverter 24. Motor 6 is then acting as a generator recovering kinetic energy from door 7 and moving parts of motor 6. The energy returned to capacitor 4 reduces the power required from boost converter 20, as converter 20 operates to maintain a uniform voltage, thus reducing overall power consumption. If the voltage across capacitor 4 exceeds Vin, then the current through boost converter 20 flows into the DC power source, returning power to the power source.

While the invention has been particularly shown and described with reference to the preferred embodiments thereof, it will be understood by those skilled in the art that the foregoing and other changes in form, and details may be made therein without departing from the spirit and scope of the invention.

The application incorporates by reference the entire disclosures of applicants' corresponding Japanese patent application no. 2003-297535, filed Aug. 21, 2003, and Japanese patent application no. 2004-061066535, filed Mar. 4, 2004.

What is claimed is:

1. A vehicle door drive system comprising:
    a motor for opening or closing a vehicle door mechanically coupled to said motor;
    an inverter having an output coupled to said motor for supplying electric power to said motor;
    a converter for boosting an input voltage supplied from a DC power source, said converter having an output coupled to an input of the inverter;
    a drive controller for controlling operations of the inverter and the converter in response to a door open/close command, and wherein said inverter returns power stored as kinetic energy of said vehicle door from the motor to the inverter input, and wherein said converter returns power from said input of said inverter to said DC power source.

2. The vehicle door drive system of claim 1, wherein said converter is a current-reversible boost converter.

3. The vehicle door drive system of claim 1, wherein said inverter is a three-phase AC inverter.

4. The vehicle door drive system of claim 1, further comprising a capacitor connected across a common connection between said inverter and said converter.

5. A vehicle door drive system according to claim 1, further comprising:
    a locking device for mechanically securing said door in a terminal position;
    a door terminal position detector for detecting when said door is secured in said terminal position and coupled to said drive controller, and wherein said drive controller determines a position of said door and in response to determining that said door is in a terminal position, the operation of the inverter and the converter is stopped.

6. The vehicle door drive system of claim 5, wherein said drive controller further comprises a timer, for determining when a predetermined period has elapsed, wherein said drive controller starts said timer when said inverter is stopped, and wherein said drive controller stops operation of said converter when said timer has expired.

7. The vehicle door drive system according to claim 5, wherein said drive controller further receives a door movement command and resumes operation of said inverter and said converter in response to said door movement command if said door is not in a terminal position corresponding to a commanded position of said door movement command.

8. The vehicle door drive system of claim 7, wherein said drive controller further comprises a timer, for determining when a predetermined period has elapsed, wherein said drive controller starts said timer when said converter is stopped, and wherein said drive controller stops operation of said converter when said timer has expired.

9. The vehicle door drive system according to claim 5, wherein said locking device locks said door in a fully closed position and wherein said door terminal position detector detects when said door is in said fully closed position.

10. The vehicle door drive system according to claim 5, wherein said locking device includes an output coupled to said drive controller for indicating when said door is locked in said fully closed position, .and wherein said drive controller determines said position of said door in conformity with an output of said door terminal position detector and said output of said locking device.

11. The vehicle door drive system according to claim 10, wherein said drive controller further calculates a position of said door, and wherein said drive controller determines said position of said door in conformity with an output of said door terminal position detector, said output of said locking device and said calculated position of said door.

12. The vehicle door drive system of claim 11, wherein said drive controller further comprises a timer, for determining when a predetermined period has elapsed, wherein said drive controller starts said timer when said inverter is stopped, and wherein said drive controller stops operation of said converter when said timer has expired.

13. The vehicle door drive system of claim 1, wherein said motor is a linear motor.

14. A method for controlling the position of a vehicle door via control of an electric motor mechanically coupled to said vehicle door, said method comprising:
    boost converting an input DC voltage from a DC power source to a second DC voltage;
    inverting said second DC voltage to provide an AC power source for said motor;
    returning kinetic energy stored in said door to said DC power source, whereby power required to position said vehicle door is reduced.

15. The method of claim 14, further comprising storing said second DC voltage in an energy storage capacitor.

16. The method of claim 14, further comprising:
    mechanically securing said door in a terminal position;
    detecting whether or not said door is secured in said terminal position;
    determining a position of said door and in response to determining that said door is in a terminal position; and
    ceasing said inverting and boost converting, in response to determining that said door is in said terminal position.

17. The method of claim 16, further comprising:
    setting a timer in response to said ceasing of said inverting; and
    determining when said timer has elapsed, and wherein said ceasing ceases said converting further in response to determining that said timer has elapsed, whereby said converting continues after said inverting has ceased.

18. The method of claim 16, further comprising:
    receiving a door movement command; and
    determining whether or not said door is in a terminal position corresponding to a commanded position of said door movement command; and
    resuming said inverting and said converting in response to determining that said door is not in a terminal position corresponding to a commanded position of said door movement command.

19. The method of claim 16, further comprising providing an indication that said securing has been performed, and wherein said ceasing is performed in further response to said indication.

20. A vehicle door drive system comprising:
- a motor for opening or closing a vehicle door mechanically coupled to said motor;
- a three-phase inverter having an output coupled to said motor for supplying three-phase AC power to said motor;
- a capacitor coupled to an input of said three-phase inverter for storing energy;
- a reversible-current boost converter for boosting an input voltage supplied from a DC power source, said converter having an output coupled to said input of the inverter and said capacitor;
- a drive controller for controlling operations of the inverter and the converter in response to a door open/close command, and wherein said inverter returns power stored as kinetic energy of said vehicle door from the motor to the inverter input, and wherein said converter returns power from said input of said inverter to said DC power source;
- a locking device for mechanically securing said door in a terminal position; and
- a door terminal position detector for detecting when said door is secured in said terminal position and coupled to said drive controller, and wherein said drive controller further determines a position of said door and in response to determining that said door is in a terminal position, the operation of the reversible-current boost converter and said three-phase inverter is stopped.

* * * * *